US012501853B2

(12) United States Patent
Skinner

(10) Patent No.: US 12,501,853 B2
(45) Date of Patent: Dec. 23, 2025

(54) TRIMMER LINE FOR STRING TRIMMERS

(71) Applicant: Shakespeare Company, LLC, Greer, SC (US)

(72) Inventor: David B Skinner, Columbia, SC (US)

(73) Assignee: Shakespeare Company, LLC, Greer, SC (US)

( * ) Notice: Subject to any disclaimer, the term of this patent is extended or adjusted under 35 U.S.C. 154(b) by 0 days.

(21) Appl. No.: 17/174,473

(22) Filed: Feb. 12, 2021

(65) Prior Publication Data

US 2021/0235618 A1 Aug. 5, 2021

Related U.S. Application Data

(63) Continuation of application No. 14/770,507, filed as application No. PCT/US2014/020243 on Mar. 4, 2014, now Pat. No. 10,993,369.

(60) Provisional application No. 61/906,465, filed on Nov. 20, 2013, provisional application No. 61/772,166, filed on Mar. 4, 2013.

(51) Int. Cl.
*A01D 34/416* (2006.01)
*A01D 34/53* (2006.01)
*B29C 53/14* (2006.01)

(52) U.S. Cl.
CPC ......... *A01D 34/4168* (2013.01); *A01D 34/53* (2013.01); *B29C 53/14* (2013.01); *Y10T 428/2973* (2015.01); *Y10T 428/2976* (2015.01)

(58) Field of Classification Search
CPC ................ A01D 34/412; A01D 34/416; A01D 34/4168; A01D 34/53; B29C 53/14; Y10T 428/2973; Y10T 428/2975; Y10T 428/2976; Y10T 428/2978

USPC .......... 30/347, 353, 356, 357; 428/397–400; D8/8

See application file for complete search history.

(56) References Cited

U.S. PATENT DOCUMENTS

| 2,434,533 | A | | 1/1948 | Wurzburger | |
|---|---|---|---|---|---|
| 2,939,202 | A | * | 6/1960 | Holland | D01D 5/253 139/420 R |
| 3,023,483 | A | | 3/1962 | Steiner | |
| 3,063,094 | A | | 11/1962 | Warthen | |
| 3,109,278 | A | * | 11/1963 | Gibson, Jr. | D02G 3/22 428/397 |
| 4,186,239 | A | * | 1/1980 | Mize | A01D 34/4168 428/397 |
| 4,869,055 | A | * | 9/1989 | Mickelson | A01D 34/4168 30/276 |

(Continued)

OTHER PUBLICATIONS

International Search Report for PCT/US2014/020243, issued Aug. 12, 2014 (2 pp.).

*Primary Examiner* — Jonathan G Riley
(74) *Attorney, Agent, or Firm* — Eversheds Sutherland (US) LLP

(57) ABSTRACT

A novel monofilament trimmer line is provided for reducing noise, reducing air drag and increasing durability by having a non-round cross-sectional shape defined as a polygon with three to six sides wherein the vertices between adjacent sides have been replaced with generous circular arcs, the arcs of a parabola, or even other arc shapes so long as the arc is convex and contains no sharp edges and wherein each arc is tangent to the two adjacent sides with a smooth and continuous transition, and the sides of the polygon are either straight or slightly convex, but not concave.

6 Claims, 19 Drawing Sheets

(56) References Cited

U.S. PATENT DOCUMENTS

| | | | |
|---|---|---|---|
| 4,905,465 A * | 3/1990 | Jones | A01D 34/4166 |
| | | | 428/397 |
| 5,220,774 A * | 6/1993 | Harbeke | A01D 34/4168 |
| | | | 428/397 |
| D349,634 S * | 8/1994 | Skinner | D15/138 |
| 5,378,537 A | 1/1995 | Masuda et al. | |
| 5,424,128 A * | 6/1995 | Fogle | A01D 34/4168 |
| | | | 428/397 |
| D364,079 S | 11/1995 | Skinner | |
| 5,463,815 A * | 11/1995 | Fogle | A01D 34/4168 |
| | | | 428/397 |
| 5,597,650 A | 1/1997 | Mallonee | |
| 5,620,797 A | 4/1997 | Mallonee | |
| 5,687,482 A * | 11/1997 | Behrendt | A01D 34/4168 |
| | | | 428/399 |
| 5,721,050 A | 2/1998 | Roman et al. | |
| 5,761,816 A | 6/1998 | Morabit et al. | |
| 5,891,288 A | 4/1999 | Proulx et al. | |
| 6,045,911 A | 4/2000 | Legrand et al. | |
| 6,124,034 A | 9/2000 | Proulx | |
| 6,352,772 B1 * | 3/2002 | Keller | D21F 1/0027 |
| | | | 428/397 |
| 6,434,837 B1 * | 8/2002 | Fogle | A01D 34/4168 |
| | | | 428/399 |
| 6,620,505 B1 | 9/2003 | Abe et al. | |
| 6,874,235 B1 | 4/2005 | Legrand | |
| 6,875,314 B2 | 4/2005 | Korfer et al. | |
| 6,910,277 B2 | 6/2005 | Proulx et al. | |
| 7,210,231 B2 | 5/2007 | Legrand | |
| 7,270,531 B2 | 9/2007 | Proulx | |
| D579,283 S * | 10/2008 | Proulx | D8/8 |
| D579,284 S * | 10/2008 | Proulx | D8/8 |
| D579,285 S | 10/2008 | Proulx | |
| D579,286 S * | 10/2008 | Proulx | D8/8 |
| 7,718,103 B2 | 5/2010 | Proulx | |
| 7,919,028 B2 | 4/2011 | Proulx | |
| 10,993,369 B2 * | 5/2021 | Skinner | A01D 34/53 |
| 2002/0086156 A1 * | 7/2002 | Walsh | D01D 5/253 |
| | | | 428/397 |
| 2006/0254062 A1 * | 11/2006 | Fogle | A01D 34/4168 |
| | | | 30/276 |
| 2007/0256309 A1 | 11/2007 | Fogle | |
| 2010/0159184 A1 * | 6/2010 | Samuelson | D01F 6/06 |
| | | | 425/464 |
| 2010/0159186 A1 | 6/2010 | Samuelson et al. | |
| 2011/0056083 A1 * | 3/2011 | Wang | A01D 34/4168 |
| | | | 30/345 |
| 2012/0208021 A1 | 8/2012 | Yang | |
| 2012/0219761 A1 * | 8/2012 | Legrand | A01D 34/4168 |
| | | | 428/162 |

* cited by examiner

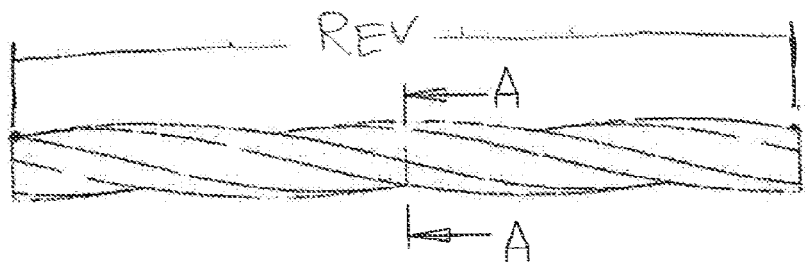
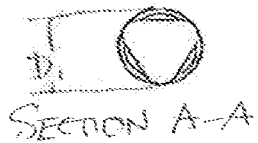
FIG. 11
FIG. 10

Twist Triangular Line

| Ratio | 0.3 | 0.25 | 0.2 | 0.15 | 0.1 | 0.05 | 0(sharp) |
|---|---|---|---|---|---|---|---|
| R1 (mm) | R0.72 | R0.6 | R0.5 | R0.36 | R0.24 | R0.12 | R0 |
| Line shape with no arc — Figure | | | | | | | |
| Y1 (mm) | 0.24 | 0.3 | 0.35 | 0.42 | 0.48 | 0.54 | 0.6 |
| Area (mm²) | 3.72 | 3.47 | 3.24 | 2.9 | 2.58 | 2.33 | 1.88 |
| Line shape with arc — Figure | | | | | | | |
| Y1 (mm) | 0.16 | 0.2 | 0.24 | 0.28 | 0.32 | 0.36 | 0.4 |
| Area (mm²) | 3.89 | 3.71 | 3.53 | 3.33 | 3.13 | 2.92 | 2.7 |

Remark: Calculated data above, D1=2.4mm (0.095inch)   Ratio=R1/D1

Fig. 13

Pentagon Twist Line

| Ratio (R1/D1) | 0.3 | 0.25 | 0.2 | 0.15 | 0.1 | 0.05 | 0[sharp] | Data Code |
|---|---|---|---|---|---|---|---|---|
| R1 (mm) | R0.72 | R0.6 | R0.5 | R0.36 | R0.24 | R0.12 | R0 | |
| Line shape with no arc Figure | | | | | | | | |
| Y1 (mm) | 0.09 | 0.11 | 0.13 | 0.16 | 0.18 | 0.21 | 0.23 | |
| Area (mm2) | 4.20 | 4.10 | 4.00 | 3.86 | 3.73 | 3.59 | 3.43 | |
| Line shape with arc Figure | | | | | | | | |
| Y1 (mm) | 0.04 | 0.05 | 0.06 | 0.08 | 0.09 | 0.11 | 0.13 | |
| Area (mm2) | 4.32 | 4.26 | 4.22 | 4.14 | 4.07 | 4.00 | 3.88 | |

Remark: Calculated data above, D1=2.4mm (0.095inch)  Ratio=R1/D1

Fig. 14

Hexagon Twist Line

| Ratio (R1/D1) | | 0.3 | 0.25 | 0.2 | 0.15 | 0.1 | 0.05 | 0 (sharp) | Data Code |
|---|---|---|---|---|---|---|---|---|---|
| R1 (mm) | | R0.72 | R0.6 | R0.5 | R0.36 | R0.24 | R0.12 | R0 | |
| Line shape with no arc | Figure | | | | | | | | |
| | Y (mm) | 0.06 | 0.08 | 0.09 | 0.11 | 0.13 | 0.14 | 0.16 | |
| | Area (mm2) | 4.29 | 4.22 | 4.16 | 4.05 | 3.96 | 3.86 | 3.75 | |
| Line shape with arc | Figure | | | | | | | | |
| | Y (mm) | 0.04 | 0.05 | 0.06 | 0.08 | 0.09 | 0.11 | 0.13 | |
| | Area (mm2) | 4.34 | 4.30 | 4.25 | 4.17 | 4.11 | 4.00 | 3.88 | |

Remark: Calculated data above, D1=2.4mm (0.095inch) Ratio=R1/D1

Fig. 15

TRIMMER LINE FOR STRING TRIMMERS

CROSS-REFERENCE TO RELATED APPLICATIONS

This application is a Continuation of U.S. patent application Ser. No. 14/770,507, filed Aug. 26, 2015, which is a national stage application under 35 U.S.C. § 371 of International Application No. PCT/US2014/020243, which claims the benefit of U.S. Provisional Application No. 61/772,166, filed Mar. 4, 2013 and U.S. Provisional Application No. 61/906,465, filed Nov. 20, 2013, the entire disclosures of which are hereby incorporated herein by reference.

BACKGROUND

The invention is an improved string trimming line for rotary string trimmer devices. The trimmer line is attached to a disc (trimmer head) which is rotated by the trimming device. The trimmer line extends essentially radially outward by virtue of the centrifugal force generated by the rotation of the trimmer head attached to the lower end of the device. The primary use for the trimmer line is for cutting grass, weeds and vegetation. The rotational speed of the trimming line is predominately determined by the motor attached to the machine but is also influenced by the air drag on the line from spinning through the air.

String trimmers are known to operate at high rotational velocities of up to 10,000 revolutions per minute (rpm), although speeds from 5,000 to 8,000 rpms are much more common. The high rotational speed of the trimming line leads to considerable noise generation by the cutting string. To resolve this problem, a wide variety of proposals have already been put forward. For example, U.S. Pat. No. 5,220,774 teaches a means of designing a noise attenuating trimmer line wherein a spiral groove or ridge is incorporated along the surface of an otherwise round non-twisted fiber.

Another solution to the noise problem, and the most common means to attenuate noise from a spinning trimmer line, is to manufacture a trimmer line with a twisted non-round cross-section. U.S. Pat. No. 5,687,482, hereby incorporated by reference, granted to Behrendt is believed to be the oldest U.S. patent for a twisted monofilament line with a non-round cross-section designed for the purpose of noise attenuation in trimmer line. In addition to noise attenuation, Behrendt claims that the concept also allows the trimmer machine to achieve higher rotational speeds, and thereby, a greater cutting performance. These types of line are commonly referred to as twist lines. Behrendt depicts the twisting of a square cross-section with flat sides and sharp edges at the vertices of the sides (FIG. 1a of the present application). Similarly, U.S. Publication No. 2007/0256309 to Fogle depicts octagon (FIG. 21) and hexagon (FIG. 22) cross-sections for twist trimmer lines having straight sides and sharp edges at the vertices between the sides (FIG. 1d of the present application).

It should be noted that the known twist trimmer lines as well as the twist trimmer lines of the present invention may be used with trimming devices powered by gasoline, propane, electricity or other commercially available sources of energy. In recent history, trimming devices having gasoline motors have dominated the largest share of the U.S. market. Unfortunately, gas-powered motors generate so much noise that the improvements achieved in attenuation of noise from the trimmer line have not heretofore been a significant factor in the U.S. market. Even though the majority of commercially available twist-shaped trimmer lines are technically effective at some level of noise attenuation, other factors such as durability and efficient use of power have become key determining factors for consumers.

Over the last few years, the use of lithium batteries for powering string trimming devices has grown significantly and continues to gain market share in the U.S. As compared to gas-powered trimming devices, battery-operated devices generate much less noise, and thus noise attenuating properties of twist trimmer line may be more appreciated. A key difference between gas-powered and battery-operated trimming devices, however, is that when a gas-powered device runs out of gas, a user can simply re-fill the tank and continue trimming vegetation. Because the batteries for trimming devices take one to three hours to recharge, a consumer notices when they have to stop trimming to recharge the battery. Because of this, battery life is becoming a big factor among consumers in determining which battery-powered trimmer to purchase. As such, the amount of drag reduction associated with a trimmer line is now a parameter which can be appreciated by the consumer because of its impact on battery life. A low-drag trimmer line can positively impact the perceived value of the entire trimmer.

As noted above, when twist lines first became commercially available, one of the first noise-attenuating trimmer lines had a twisted-square cross-section with sharp edges. Even though this twisted shape attenuated noise, it had shortcomings. Most notably, the mass of the twisted square shape was reduced by 35 to 40% compared to a round filament of the same outside diameter. This reduction in mass equated to less durability. A trimmer line's durability is a function of the cross-sectional shape, the production process, the materials comprising the line, and the mass of the line. To improve the durability of a twist trimmer line, the twist trimmer line's mass must approach the same mass as a round filament. In general, the space occupied by a cylinder circumscribing the twisted square shape should be the same or close to the same size as the space occupied by the round filament.

Similar to the need to improve durability of noise-attenuating trimmer line is the need to decrease the air drag created by the line. Twist trimmer lines have been made from a large variety of cross-sectional shapes, and shaped monofilaments twisted along their longitudinal axis are known to attenuate noise relative to non-twisted lines of the same cross-sectional shape, when spun using string trimmers. However, outside of the polygons of the prior art listed above, as well as oval-shaped twist trimmer lines (U.S. Pat. No. 6,434,837), all of the proposed cross-sectional shapes for twist trimmer lines have either sharp longitudinal edges, concaved longitudinal grooves, and/or twisted non-round cross-sections with concaved longitudinal sides. Twisted lines with sharp edges and/or grooves do attenuate noise when spun in the air, but they either do not reduce drag when spun in the air or they do not sufficiently reduce drag to the same degree as the noise is attenuated.

With the exception of oval lines, which by definition do not have well defined edges, the prior art does not discuss the effect of applying a generous radius to replace the sharp well defined edges that are now commonplace among commercial twist lines. More specifically, the prior art does not propose adding a generous radius to twisted polygon shapes, nor does it define the benefit of doing so. Through experimentation it has been found that the amount of radius applied where the sides of a polygon converge is an important factor in reducing drag and thus increasing battery life of the device. Applying a generous radius where the sides of a polygon converge and then twisting the resulting cross-sectional shape can result in a line that both significantly reduces drag as well as noise generated when spinning line in the air. The optimum amount of twist to reduce drag has been found to not be the same as the amount of twist used to attenuate noise. For noise attenuation, the preferred level of twist reported in the prior art is typically one revolution of twist per inch. For reducing drag, less twist per inch is preferred.

This invention identifies a new class of cross-sectional shapes for trimmer line, which when twisted minimize the drag generated by the trimmer line and yet also have more mass (more durability), when compared to other twist line shapes of comparable size (defined by a circle/cylinder that circumscribes the twisted shapes). The present invention is focused on providing novel trimming lines of the type that will attenuate noise when spun at high speeds, maximize battery life due to low drag, will spin in a flat plane, and yet be designed to either have significant mass and/or made with materials that result in long life.

BRIEF SUMMARY

This invention proposes a new class of twisted trimmer line with non-round cross-sections-twisted polygons. The cross-sectional shapes are defined as polygons with three to six sides, where the vertices between adjacent sides have been replaced with generous circular arcs, the arcs of a parabola, or even other arc shapes so long as the arc is convex and contains no sharp edges. Each arc is tangent to the two adjacent sides with a smooth and continuous transition, and the sides of the polygon are essentially straight. The radius to apply to the convergence point of two adjacent sides is defined as the ratio of $R_1/D_1$, where $R_1$ is the radius at the convergence point of two sides, and $D_1$ is the diameter of a circle that circumscribes the entire cross-sectional shape. The ratio of $R_1/D_1$ should be at least around 0.05 but could be as great as around 0.3. The preferred ratio of $R_1/D_1$ is 0.2.

The polygon shapes of this invention are further defined in that the sides are not concaved. The sides should either be straight (flat) or bulge outward (convex). Additionally, the sides should not contain concaved longitudinal grooves. When these non-round shaped monofilaments are twisted and spun longitudinally, the outermost portions of the shape define a cylinder. The amount of outwardly bulge of the sides should not exceed 50% of the distance (length) between the side of the polygon and a circle circumscribing the shape. When trimmer line is spun at high speeds, sharp edges, longitudinal grooves and concaved sides result in a less aerodynamic profile and thus an increase in drag. The shape of the invention's cross-section has been selected to make the trimmer line more aerodynamic when spun at high velocities.

The filaments of this invention are also defined by the amount of twist or rotation of the cross-section shape about its central longitudinal axis. The rotation is defined similarly to the definition used by Behrendt. The rotation can be described with the aid of an imaginary line on the surface of the trimmer line (prior to rotation) which is parallel to the fiber's longitudinal axis and which touches a plane upon which the fiber is resting. One revolution is defined by two adjacent points on the imaginary line which are touching the same plane after the fiber is twisted. The invention is further defined as having one revolution of twist between every 0.75 inches to one revolution of twist every 3.0 inches. Ideally, the amount of twist would be one revolution very 1.7 inches.

One advantage of the invention is that the filaments cross-sectional shapes and amount of twist have been selected to minimize air drag, maximize mass and thus optimize the life of a battery and the line's durability.

Another advantage of the invention is that the filament spins in a plane with minimal deviation from that plane and thus allows the machine operator better control when edging and trimming. This performance feature also means the line is less apt to tear the tips of fine grass and thus minimizes the browning of the grass.

Another advantage of the invention is that the material has been selected to optimize durability of the filament allowing long life of the trimmer line independent of the other factors contributing to the line's durability.

For a fuller understanding of the nature and advantages of the present invention, reference should be made to the ensuing detailed description and accompanying drawings.

BRIEF DESCRIPTION OF DRAWINGS

FIG. 10 is a side view of one of the versions of trimmer line shown in FIGS. 3a-f;

FIG. 11 is a cross-sectional view of the trimmer line shown in FIG. 10;

FIG. 13 shows the cross-sectional shape of the twist line, the characteristics of which are shown in TABLES 2A and 2B;

FIG. 14 shows the cross-sectional shape of the twist line, the characteristics of which are shown in TABLES 3A and 3B; and FIG. 15 shows the cross-sectional shape of the twist line, the characteristics of which are shown in TABLES 4A and 4B.

DETAILED DESCRIPTION

Figure 1A:
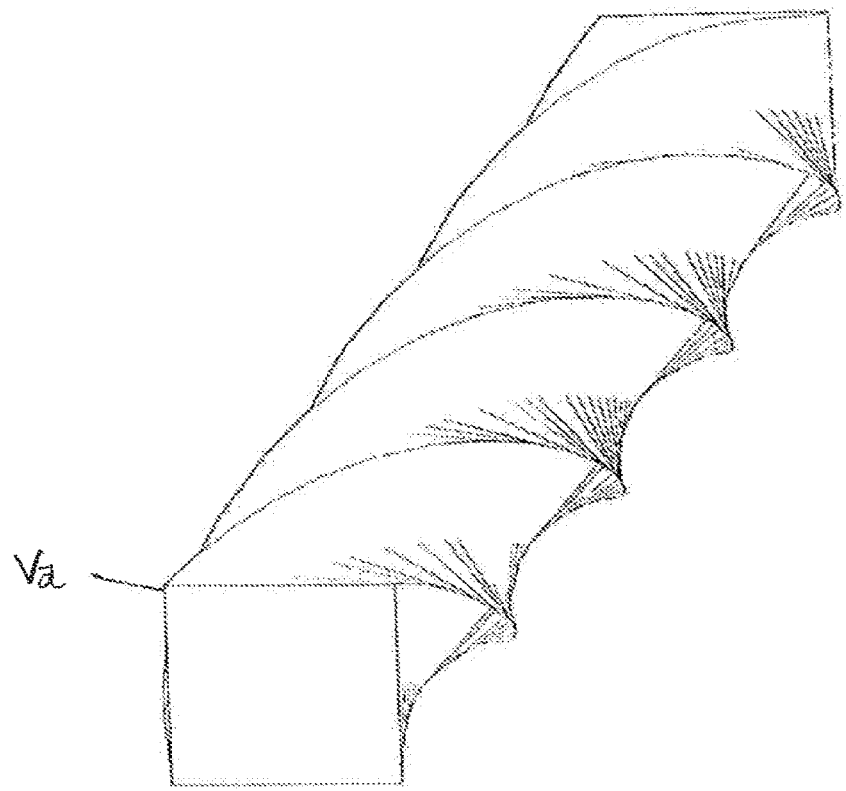
FIGS. 1a-d show twist trimmer line from the prior art comprising sharp edges between adjacent polygon sides.
Figure 1B:
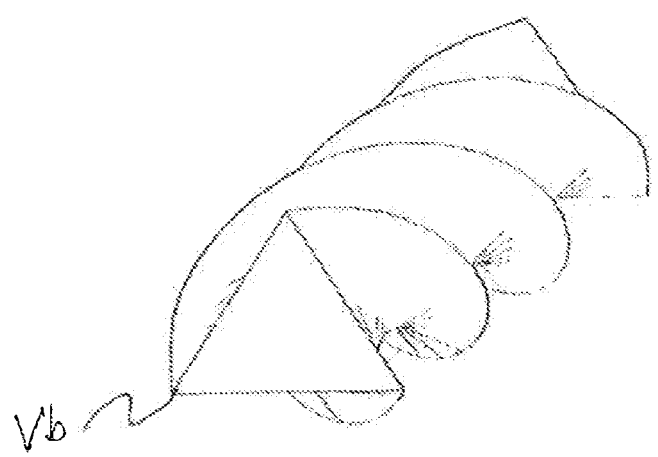
Figure 1C:
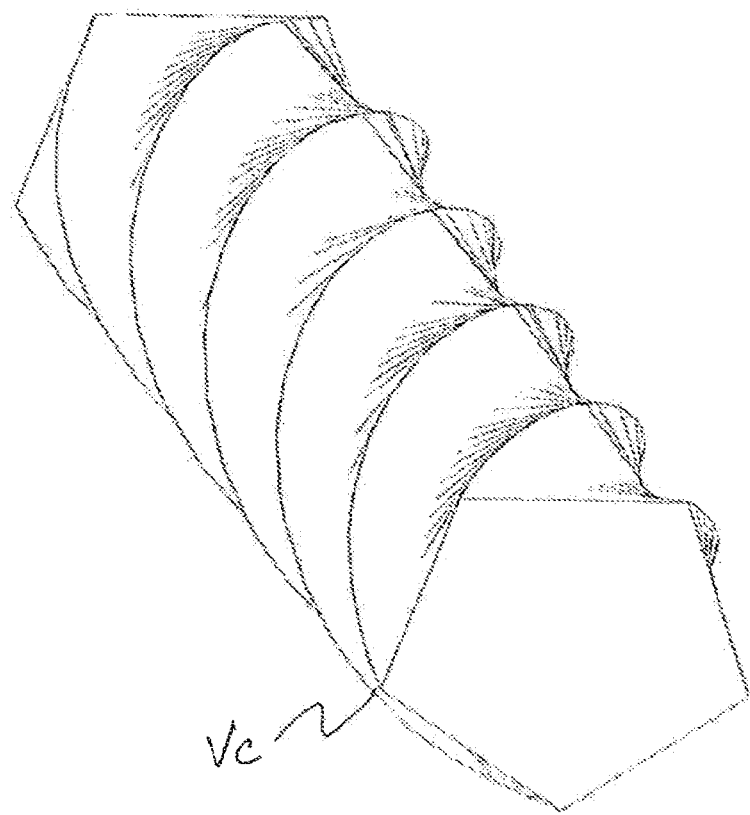
Figure 1D:
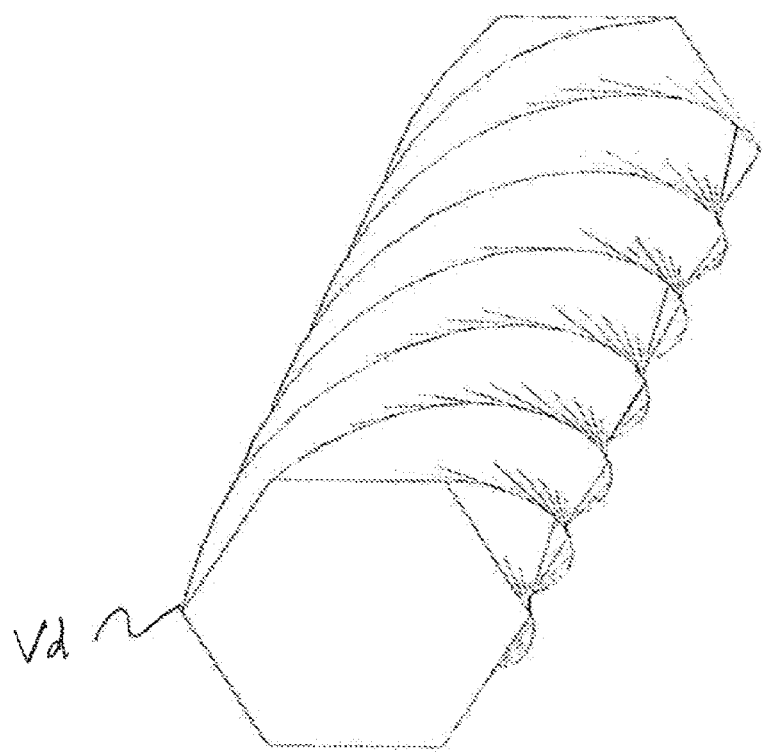

The cross-sectional shapes of the twist trimmer lines of this invention consist of polygons with three to six sides, with a generous radius at the vertices between each of the two adjacent sides. The sides of the polygons can range from generally flat (FIGS. 2-5) to outwardly bowed (convex) (FIGS. 6-9).

FIGS. 1a-d are examples of prior twisted trimmer lines. The twisted fibers have different cross-sectional shapes, but there is no radius at the vertices Va-Va between the adjacent sides of each polygon. The edges form a sharp angle.

FIGS. 2a-f depict a series of fibers with cross-sections that fall within the scope of the invention. The cross-sections of these fibers are generally square, but with a generous radius ($R_1$) replacing the vertices between the sides. If the diameter of a circle circumscribing these cross-sections is labeled generally as $D_1$, then the radii ($R_1$) in FIGS. 2a-f can be expressed by the ratio of $R_1/D_1$. For the twisted square-shaped filaments of this invention, this ratio ($R_1/D_1$) is defined as being less than or equal to 0.30 but greater than or equal to 0.05:

$$0.05 \leq R_1/D_1 \leq 0.30$$

In FIGS. 2a-f, each radius at the vertices is defined by a portion of a circular arc A. These arcs are continuous and tangent to the two adjacent sides; and in FIGS. 2a-f, the sides $S_1$-$S_4$ are essentially straight or flat.

The value of diameter ($D_1$) circumscribing the fibers depicted in FIGS. 2a-f can range from 1.2 mm to 4.5 mm. However, for the examples in TABLE 1A, the diameter $D_1$ is assigned the value of 2.4 mm. As a point of reference, a solid round fiber with diameter 2.4 mm has an area ($Area_0$) of 4.52 mm$^2$.

TABLE 1A

Theoretical Values for Twisted Square Cross-Sections with Various Radii ($R_1$)

| | FIG. | | | | | | |
|---|---|---|---|---|---|---|---|
| | 2f | 2e | 2d | 2c | 2b | 2a | 1a |
| $D_1$ (mm) | 2.4 | 2.4 | 2.4 | 2.4 | 2.4 | 2.4 | 2.4 |
| $R_1/D_1$ | 0.30 | 0.25 | 0.20 | 0.15 | 0.10 | 0.05 | 0 |
| $R_1$ (mm) | 0.72 | 0.6 | 0.5 | 0.36 | 0.24 | 0.12 | 0 |
| $Y_1$ (mm) | 0.14 | 0.18 | 0.21 | 0.25 | 0.28 | 0.32 | 0.35 |
| $Area_1$ (mm)$^2$ | 4.05 | 3.89 | 3.78 | 3.53 | 3.33 | 3.12 | 2.89 |
| $Area_1/Area_0$ | 0.92 | 0.86 | 0.83 | 0.78 | 0.74 | 0.69 | 0.64 |

In TABLE 1A, the length of the midpoint of each side radially outward to the circle circumscribing the shape has been labeled as $Y_1$. The radius ($R_1$,) in mm has been calculated by multiplying the diameter ($D_1$) by the ratio $R_1/D_1$ shown in the table. The $Area_1$ was calculated based upon the geometry and the other values shown in TABLE 1A. The final row of values in TABLE 1A is a ratio of the cross-sectional area of the invention ($Area_1$) divided by the cross-sectional area of a round fiber with the same diameter as $D_1$ ($Area_0$).

TABLE 1A can be read as follows: The cross-section of the twisted fiber in FIG. 2d can be circumscribed by a circle with diameter of 2.4 mm. The radius in each of the four corners is 0.5 mm. The distance from the mid-point of each side radially outward to the circle circumscribing the shape is 0.21 mm. The cross-sectional area of this fiber is 3.78 mm$^2$, which is 83% ($Area_1/Area_0$) of the area of a solid round fiber of the same diameter.

It is important to note that the area of the trimmer lines (fibers) in TABLE 1A approach the area of a solid round circle as the radii ($R_1$) is increased. More area equates to more mass which will improve the fiber's durability and useful life. However, these fibers retain their benefits of reduced noise generation and reduced drag. Additionally, all of the fibers of the invention listed in TABLE 1A have larger cross-sectional areas than the cross-section area of the fiber listed in FIG. 1a when the fibers are sized to fit into the same circumscribing cylinder.

FIGS. 3a-f depict a series of fibers with cross-sections that fall within the scope of this invention. The cross-sections of these fibers are all generally triangular, but with each vertex comprising a generous circular arc defined by radius ($R_1$). If a circle circumscribing these cross-sections is labeled generally as $D_1$, then the radii in FIGS. 3 a-f can be expressed by the ratio of $R_1/D_1$. For the twisted triangular-shaped filaments of this invention, this ratio ($R_1/D_1$) is defined as being less than or equal to 0.30 but greater than or equal to 0.05:

$$0.05 \leq R_1/D_1 \leq 0.30$$

In FIGS. 3a-f, each radius at the vertices is defined by a portion of a circular arc. These arcs are continuous and tangent to the two adjacent sides; and in FIGS. 3a-f, the sides are essentially straight or flat.

The value of diameter ($D_1$) circumscribing the fibers depicted in FIGS. 3a-f can range from 1.2 mm to 4.5 mm. However, for the examples in TABLE 2A, the diameter $D_1$ is assigned the value of 2.4 mm. As a point of reference, a solid round fiber with diameter 2.4 mm has an area ($Area_0$) of 4.52 mm$^2$.

TABLE 2A

Theoretical Values for Twisted Triangular Cross-Sections with Various Radii ($R_1$)

| | FIG. | | | | | | |
|---|---|---|---|---|---|---|---|
| | 3f | 3e | 3d | 3c | 3b | 3a | 1b |
| $D_1$ (mm) | 2.4 | 2.4 | 2.4 | 2.4 | 2.4 | 2.4 | 2.4 |
| $R_1/D_1$ | 0.30 | 0.25 | 0.20 | 0.15 | 0.10 | 0.05 | 0 |
| $R_1$ (mm) | 0.72 | 0.6 | 0.5 | 0.36 | 0.24 | 0.12 | 0 |
| $Y_1$ (mm) | 0.24 | 0.3 | 0.35 | 0.42 | 0.48 | 0.54 | 0.6 |
| $Area_1$ (mm)$^2$ | 3.72 | 3.47 | 3.24 | 2.9 | 2.58 | 2.33 | 1.88 |
| $Area_1/Area_0$ | 0.82 | 0.77 | 0.72 | 0.64 | 0.57 | 0.52 | 0.42 |

In TABLE 2A, the length of the midpoint of each side radially outward to the circle circumscribing the shape has been labeled as $Y_1$. The radius ($R_1$) in mm has been calculated by multiplying the diameter ($D_1$) by the ratio $R_1/D_1$ shown in the table. The $Area_1$ was calculated based upon the geometry and the other values shown in TABLE 2A. The final row of values in TABLE 2A is a ratio of the cross-sectional area of the invention ($Area_1$) divided by the cross-sectional area of a round fiber with the same diameter as $D_1$ ($Area_0$).

TABLE 2A can be read as follows: The cross-section of the twisted fiber in FIG. 3c can be circumscribed by a circle with diameter of 2.4 mm. The radius in each of the three corners is 0.36 mm. The distance from the mid-point of each side radially outward to the circle circumscribing the shape is 0.42 mm. The cross-sectional area of this fiber is 2.9 mm², which is 64% (Area₁/Area₀) of the area of a solid round fiber of the same diameter.

FIGS. 4a-f depict a series of fibers with cross-sections that fall within the scope of this invention. The cross-sections of these fibers are all generally pentagonal, but with each vertex comprising a generous circular arc defined by radius ($R_1$). If a circle circumscribing these cross-sections is labeled generally as $D_1$, then the radii in FIGS. 4a-f can be expressed by the ratio of $R_1/D_1$. For the twisted pentagonal-shaped filaments of this invention, this ratio ($R_1/D_1$) is defined as being less than or equal to 0.30 but greater than or equal to 0.05:

$$0.05 \leq R_1/D_1 \leq 0.30$$

In FIGS. 4a-f, each radius at the vertices is defined by a portion of a circular arc. These arcs are continuous and tangent to the two adjacent sides; and in FIGS. 4a-f, the sides are essentially straight or flat.

The value of diameter ($D_1$) circumscribing the fibers depicted in FIGS. 4a-f can range from 1.2 mm to 4.5 mm. However, for the examples in TABLE 3A, the diameter $D_1$ is assigned the value of 2.4 mm. As a point of reference, a solid round fiber with diameter 2.4 mm has an area (Area₀) of 4.52 mm².

TABLE 3A

Theoretical Values for Twisted Pentagonal Cross-Sections with Various Radii ($R_1$)

| | FIG. | | | | | | |
|---|---|---|---|---|---|---|---|
| | 4f | 4e | 4d | 4c | 4b | 4a | 1c |
| $D_1$ (mm) | 2.4 | 2.4 | 2.4 | 2.4 | 2.4 | 2.4 | 2.4 |
| $R_1/D_1$ | 0.30 | 0.25 | 0.20 | 0.15 | 0.10 | 0.05 | 0 |
| $R_1$ (mm) | 0.72 | 0.6 | 0.5 | 0.36 | 0.24 | 0.12 | 0 |
| $Y_1$ (mm) | 0.09 | 0.11 | 0.13 | 0.16 | 0.18 | 0.21 | 0.23 |
| Area₁ (mm)² | 4.20 | 4.10 | 4.00 | 3.86 | 3.73 | 3.59 | 3.43 |
| Area₁/Area₀ | 0.93 | 0.91 | 0.88 | 0.85 | 0.83 | 0.79 | 0.76 |

In TABLE 3A, the length of the midpoint of each side radially outward to the circle circumscribing the shape has been labeled as $Y_1$. The radius ($R_1$) in mm has been calculated by multiplying the diameter ($D_1$) by the ratio $R_1/D_1$ shown in the table. The Area₁ was calculated based upon the geometry and the other values shown in TABLE 3A. The final row of values in TABLE 3A is a ratio of the cross-sectional area of the invention (Area₁) divided by the cross-sectional area of a round fiber with the same diameter as $D_1$ (Area₀).

TABLE 3A can be read as follows: The cross-section of the twisted fiber in FIG. 4b can be circumscribed by a circle with diameter of 2.4 mm. The radius in each of the five corners is 0.24 mm. The distance from the mid-point of each side radially outward to the circle circumscribing the shape is 0.18 mm. The cross-sectional area of this fiber is 3.73 mm², which is 83% (Area₁/Area₀) of the area of a solid round fiber of the same diameter.

Again, it is notable that as the radius $R_1$ is increased, the area of the monofilament fiber (invention) approaches the area of a round fiber (standard trimmer line) of the same circumscribing diameter. Whereas the area of the twisted square invented by Behrendt had 64% of the area of a circumscribed circle of the same diameter, the example depicted by FIG. 4d has 88% of a circumscribed circle of the same diameter. This increase in area equates to an increase in mass, which equates to more durability.

FIGS. 5a-f depict a series of fibers with cross-sections that fall within the scope of this invention. The cross-sections of these fibers are all generally hexagonal, but with each vertex comprising a generous circular arc defined by radius ($R_1$). If a circle circumscribing these cross-sections is labeled generally as $D_1$, then the radii in FIGS. 5a-f can be expressed by the ratio of $R_1/D_1$. For the twisted hexagonal-shaped filaments of this invention, this ratio ($R_1/D_1$) is defined as being less than or equal to 0.30 but greater than or equal to 0.05:

$$0.05 \leq R_1/D_1 \leq 0.30$$

In FIGS. 5a-f, each radius at the vertices is defined by a portion of a circular arc. These arcs are continuous and tangent to the two adjacent sides; and in FIGS. 5a-f, the sides are essentially straight or flat.

The value of diameter ($D_1$) circumscribing the fibers depicted in FIGS. 5a-f can range from 1.2 mm to 4.5 mm. However, for the examples in TABLE 4A, the diameter $D_1$ is assigned the value of 2.4 mm. As a point of reference, a solid round fiber with diameter 2.4 mm has an area (Area₀) of 4.52 mm².

TABLE 4A

Theoretical Values for Twisted Hexagonal Cross-Sections with Various Radii ($R_1$)

| | FIG. | | | | | | |
|---|---|---|---|---|---|---|---|
| | 5f | 5e | 5d | 5c | 5b | 5a | 1d |
| $D_1$ (mm) | 2.4 | 2.4 | 2.4 | 2.4 | 2.4 | 2.4 | 2.4 |
| $R_1/D_1$ | 0.30 | 0.25 | 0.20 | 0.15 | 0.10 | 0.05 | 0 |
| $R_1$ (mm) | 0.72 | 0.6 | 0.5 | 0.36 | 0.24 | 0.12 | 0 |
| $Y_1$ (mm) | 0.06 | 0.08 | 0.09 | 0.11 | 0.13 | 0.14 | 0.16 |
| Area₁ (mm)² | 4.29 | 4.22 | 4.16 | 4.05 | 3.96 | 3.86 | 3.75 |
| Area₁/Area₀ | 0.95 | 0.93 | 0.92 | 0.90 | 0.88 | 0.85 | 0.83 |

In TABLE 4A, the length of the midpoint of each side radially outward to the circle circumscribing the shape has been labeled as $Y_1$. The radius ($R_1$) in mm has been calculated by multiplying the diameter ($D_1$) by the ratio $R_1/D_1$ shown in the table. The Area₁ was calculated based upon the geometry and the other values shown in TABLE 4A. The final row of values in TABLE 4A is a ratio of the cross-sectional area of the invention (Area₁) divided by the cross-sectional area of a round fiber with the same diameter as $D_1$ (Area₀).

Figure 12:
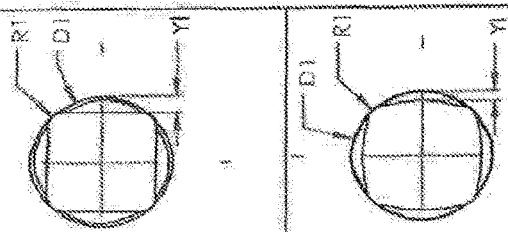
FIG. 12 shows the cross-sectional shape of the twist line, the characteristics of which are shown in TABLES 1A and 1B.

TABLE 4A can be read as follows: The cross-section of the twisted fiber in FIG. 5e can be circumscribed by a circle with diameter of 2.4 mm. The radius in each of the six corners is 0.6 mm. The distance from the mid-point of each side radially outward to the circle circumscribing the shape is 0.08 mm. The cross-sectional area of this fiber is 4.22 mm², which is 93% (Area₁/Area₀) of the area of a solid round fiber of the same diameter, A modified class of shaped twisted lines defined by this invention includes the same shapes in FIGS. 2a-f; FIGS. 3a-f; FIGS. 4a-f and FIGS. 5a-f, but modified to allow the straight sides of the polygons to bow radially outward (FIGS. 6a-f; FIGS. 7a-f; FIGS. 8a-f and FIGS. 9a-f). Defined mathematically, the midpoints of the straight sides of the polygons are allowed to bow outward by up to 50% of the distance $Y_1$ listed in TABLES 1A, 2A, 3A and 4A. The visual representations in FIGS. 6a-f; FIGS. 7a-f; FIGS. 8a-f and FIGS. 9a-f show the midpoint of the straight sides of the polygons bowed outward by 33% of the distance $Y_1$ as listed in the prior TABLES 1A, 2A, 3A and 4A. FIG. 12 shows a visual representation of the cross-sectional shape of the twisted lines characterized in TABLE 1A and TABLE 1B. Similarly, FIG. 13 shows a visual representation of the cross-sectional shape of the twisted lines characterized in TABLES 2A and 2B; FIG. 14 shows a visual representation of the cross-sectional shape of the twisted lines characterized in TABLES 3A and 3B; and FIG. 15 shows a visual representation of the cross-sectional shape of the twisted lines characterized in TABLES 4A and 4B, indicating the reference measurements $R_1$, $D_1$ and $Y_1$ for each. The values for ratio $R_1/D_1$, distance $Y_1$, $Area_1$, and ratio of $Area_1/Area_0$ in TABLES 1A, 2A, 3A, 4A, 1B, 2B, 3B, and 4B have been rounded to two decimal places.

For example, TABLE 1A provides the values of $Y_1$ as previously defined for twisted square shapes with a range of radii. As the radii ($R_1$) increases, the value of $Y_1$ decreases and the area increases. The data in TABLE 1A is representative of twisted fibers per FIGS. 2a-f, where the shape is circumscribed by a 2.4 mm circle. If the midpoints of the sides of these twisted squares are allowed to bow outward by 33% of the value $Y_1$ as shown in Table 1A, then the respective fiber shapes in FIGS. 2a-f will be transformed into the shapes shown in FIGS. 6a-f.

The practical commercial value of $D_1$ for the fibers depicted in FIGS. 6a-f can range from 1.2 mm to 4.5 mm. However, for the examples in TABLE 1B, the diameter $D_1$ is assigned the value of 2.4 mm. As a point of reference, a solid round fiber with diameter 2.4 mm has an area ($Area_0$) of 4.52 mm².

As can be seen from TABLE 1B, the value of $Y_1$ is now reduced by 33% compared to the values in TABLE 1A. As a result, the area of each fiber has increased relative to the examples in TABLE 1A. More area equates to more mass, which improves the durability and useful life of the twisted fiber.

TABLE 1B

Theoretical Values for Twisted Square Cross-Sections with Various Radii and Bowed Sides

| | FIG. | | | | | | |
|---|---|---|---|---|---|---|---|
| | 6f | 6e | 6d | 6c | 6b | 6a | 1a |
| $D_1$ (mm) | 2.4 | 2.4 | 2.4 | 2.4 | 2.4 | 2.4 | 2.4 |
| $R_1/D_1$ | 0.30 | 0.25 | 0.20 | 0.15 | 0.10 | 0.05 | 0 |
| $R_1$ (mm) | 0.72 | 0.6 | 0.5 | 0.36 | 0.24 | 0.12 | 0 |
| $Y_1$ (mm) | 0.08 | 0.10 | 0.11 | 0.15 | 0.18 | 0.22 | 0.35 |
| $Area_1$ (mm)² | 4.17 | 4.09 | 4.05 | 3.86 | 3.70 | 3.52 | 2.89 |
| $Area_1/Area_0$ | 0.92 | 0.905 | 0.895 | 0.85 | 0.81 | 0.78 | 0.64 |

Likewise, FIGS. 7a-f show six versions of the invention which are identical to the versions shown in FIGS. 3a-f, except that the sides of the triangular polygons are shown bowed outward by 33% of the values of $Y_1$ listed in TABLE 2A. TABLE 2B provides corresponding values for these new fibers based upon cross-sections that are circumscribed by a 2.4 mm circle.

TABLE 2B

Theoretical Values for Twisted Triangular Cross-Sections with Various Radii and Bowed Sides

| | FIG. | | | | | | |
|---|---|---|---|---|---|---|---|
| | 7f | 7e | 7d | 7c | 7b | 7a | 1b |
| $D_1$ (mm) | 2.4 | 2.4 | 2.4 | 2.4 | 2.4 | 2.4 | 2.4 |
| $R_1/D_1$ | 0.30 | 0.25 | 0.20 | 0.15 | 0.10 | 0.05 | 0 |
| $R_1$ (mm) | 0.72 | 0.6 | 0.5 | 0.36 | 0.24 | 0.12 | 0 |
| $Y_1$ (mm) | 0.16 | 0.20 | 0.24 | 0.28 | 0.32 | 0.36 | 0.6 |
| $Area_1$ (mm)² | 3.89 | 3.71 | 3.53 | 3.33 | 3.13 | 2.92 | 1.88 |
| $Area_1/Area_0$ | 0.86 | 0.825 | 0.78 | 0.74 | 0.69 | 0.64 | 0.42 |

FIGS. 8a-f show six versions of the invention which are identical to the versions shown in FIGS. 4a-f, except that, the sides of the pentagons are shown bowed outward by 33% of the values of $Y_1$ listed in TABLE 3A. TABLE 3B provides corresponding values for these new fibers based upon cross-sections that are circumscribed by a 2.4 mm circle.

TABLE 3B

Theoretical Values for Twisted Pentagonal Cross-Sections with Various Radii and Bowed Sides

| | FIG. | | | | | | |
|---|---|---|---|---|---|---|---|
| | 8f | 8e | 8d | 8c | 8b | 8a | 1c |
| $D_1$ (mm) | 2.4 | 2.4 | 2.4 | 2.4 | 2.4 | 2.4 | 2.4 |
| $R_1/D_1$ | 0.30 | 0.25 | 0.20 | 0.15 | 0.10 | 0.05 | 0 |
| $R_1$ (mm) | 0.72 | 0.6 | 0.5 | 0.36 | 0.24 | 0.12 | 0 |
| $Y_1$ (mm) | 0.04 | 0.05 | 0.06 | 0.08 | 0.09 | 0.11 | 0.23 |
| $Area_1$ (mm)² | 4.32 | 4.26 | 4.22 | 4.14 | 4.07 | 4.00 | 3.43 |
| $Area_1/Area_0$ | 0.96 | 0.94 | 0.93 | 0.92 | 0.90 | 0.88 | 0.76 |

FIGS. 9a-f show six versions of the invention which are identical to the versions shown in FIGS. 5a-f, except that the sides of the hexagons are shown bowed outward by 33% of the values of $Y_1$ listed in TABLE 4A. TABLE 4B provides corresponding values for these new fibers based upon cross-sections that are circumscribed by a 2.4 mm circle.

TABLE 4B

Theoretical Values for Twisted Hexagonal Cross-Sections with Various Radii and Bowed Sides

| | FIG. | | | | | | |
|---|---|---|---|---|---|---|---|
| | 9f | 9e | 9d | 9c | 9b | 9a | 1d |
| $D_1$ (mm) | 2.4 | 2.4 | 2.4 | 2.4 | 2.4 | 2.4 | 2.4 |
| $R_1/D_1$ | 0.30 | 0.25 | 0.20 | 0.15 | 0.10 | 0.05 | 0 |
| $R_1$ (mm) | 0.72 | 0.6 | 0.5 | 0.36 | 0.24 | 0.12 | 0 |
| $Y_1$ (mm) | 0.04 | 0.05 | 0.06 | 0.08 | 0.09 | 0.11 | 0.16 |
| $Area_1$ (mm)² | 4.34 | 4.30 | 4.25 | 4.17 | 4.11 | 4.00 | 3.75 |
| $Area_1/Area_0$ | 0.96 | 0.95 | 0.94 | 0.92 | 0.91 | 0.88 | 0.83 |

In the above examples, the arcs joining the adjacent sides of the polygons are circular arcs. The choice of arcs for the invention includes circular arcs, the arcs of a parabola, and other arc shapes so long as the arc is convex and contains no sharp edges. Each arc is tangent to the two adjacent sides with a smooth transition. As shown in FIGS. 6-9 and 12-15, the midpoint of each side as defined by a line connecting the two consecutive radii could bulge outwardly by as much as 50% of the distance from the midpoint of each flat side radially outward to a circle circumscribing the cross-section of fiber.

For polygons with an even number of sides (squares, hexagons and the like) the size of the arc for every other vertex could be different from the arc used for the in-between vertices. Likewise, for polygons with an even number of sides, the shape of the arc for every other vertex could be different from the shape of the vertices used for the in-between vertices.

Another aspect of the invention is that the cross-sectional shape is rotated uniformly along the length of the longitudinal axis. In all embodiments of the invention the cross-section is maintained constant and uniform over the entire longitudinal axis within the limits of manufacturing capabilities. However, the rotation of the cross-section relative to the longitudinal axis varies continuously by a specific angular amount per unit of length. In a square cross-section defined in the prior art, this results in the rotating trimmer line with four edges extending helically (FIG. 1a). For the twisted shapes of the present invention, no sharp edges would be extended helically. Instead, large and smooth radii would extend helically separated by smooth sides (FIGS. 2a-2f, as well as FIGS. 3-9). The sides are not recessed relative to the arc at each vertex. The advantages of the new trimmer lines of this invention are that flow resistance or air drag on the rotating line is reduced, noise generated by the line's rotation is attenuated, for trimmer machines with torque motors the rotational speed of the tool is increased, the plane of rotation of the line is more uniform, and the mass of the novel trimmer line approaches the mass of solid fiber with the same circumferential diameter, thereby improving the durability of the trimmer line over twisted lines of the prior art.

A degree of twisting in the order of magnitude of 20 twists per meter (20 t/m) means that the rotating trimming line is twisted by 360 degrees twenty times over the one meter length. The minimum level of twisting desired for this invention is 13.1 t/m; and, the maximum level of twist desired is 52.5 t/m. This is equivalent to one revolution of twist (360 degrees of rotation) every 0.75 to 3.00 inches. The ideal level of twist is 24.6 t/m, or one revolution of twist every 1.6 to 1.7 inches. The rotation can be described with the aid of an imaginary line on the surface of the trimmer line (prior to rotation) which is parallel to the fiber's longitudinal axis and which touches a plane upon which the fiber is resting. One revolution (REV) is defined by two adjacent points on the imaginary line which are touching the same plane after the fiber is twisted (FIG. 10). The amount of twist along the fiber's length would ideally be constant within the limitations of the twisting process, but a variable level of twist would also be acceptable.

There are three ways to fabricate twist into monofilament trimmer line. One means is to rotate or spin the capillary in the spinneret plate from which the molten plastic is extruded. A second means is to rotate the spool both axially and longitudinally as the filament is wound onto the spool. These first two means can be accomplished during the extrusion process used to manufacture the monofilament trimmer line. The third means to impart twist to a filament is to perform the twisting after the monofilament is manufactured. To twist a short length of trimmer line, one end is first clamped and secured. Then the other end of the filament is rotated while the length of the fiber is exposed to sufficient heat. The twisted formation is constrained and allowed to cool. Alternately, the fiber can be twisted continuously by rotating the payoff spools to impart rotation into the fiber, while at the same time removing line from the spool, passing it through a nip to hold the twist, exposing the line continuously to heat to set the shape, cooling the line, passing it through a second nip, and winding the line onto a take-up spool.

A preferred embodiment is a twisted equilateral triangle (three-sided polygon) where each of the three vertices has been replaced with a generous circular arc.

A second preferred embodiment is a twisted square (four-sided polygon) where each of the four vertices has been replaced with a generous circular arc.

A third preferred embodiment is a twisted pentagon (five-side polygon) where each of the five vertices has been replaced with a generous circular arc.

A fourth preferred embodiment is a twisted hexagon (six-sided polygon) where each of the six vertices has been replaced with a generous circular arc.

Additional preferred embodiments include the above embodiments where the sides are equally bowed outward.

Testing

To measure the impact of a fiber's shape on battery life, the following setup was used. A model CGT400 string trimmer manufactured by Core Outdoor Power was mounted on a stand such that the trimmer head was suspended above the floor of the lab. A Shakespeare™ brand Fury™ trimmer head was mounted on the CGT400 trimmer. The Fury™ head is designed to hold two lengths of trimmer line using two sets of dual clamps. For all of the examples below, the line samples were cut to have a blunt tip and cut to a length of 6.5 inches. A mark was made on all samples 5 inches from the blunt tip. When installing the line in the Fury™ head, this mark was centered in the eyelet of the head so that 5 inches of line extended from each eyelet. The two opposing eyelets are three inches apart. Thus the line swatch was 13 inches.

The CGT400 trimmer is powered by lithium batteries. The unit was operated at low speed for the following examples. At low speed, the trimmer spins trimmer lines at a constant rate of 5,005 rpms. The controls for the CGT400 vary the amount of electricity used from the battery to maintain the 5,005 rpms. If a particular trimmer line shape has lots of air drag, then the demand for electricity on the battery increases and the battery runs out of power in a shorter period of time. If a different line shape is more aerodynamic, then less power is required to spin the line and the battery will run for a longer period of time before electricity in the lithium battery is consumed.

For all of the tests discussed below, the same lithium battery and the same battery charger were used. The battery took a minimum of three hours to charge for each test. The trimmer machine throttle was taped to maintain the trimmer operating continuously. Once the charged battery was inserted into the trimmer it would begin spinning the line samples and would run until the battery was depleted. The same battery would be fully recharged for the next test.

The noise generated by each sample of trimmer line was measured using a digital sound level meter model 407750 from Extech. The sound was measured 58 inches from the trimmer head, just above the throttle of the trimmer. The samples selected were all approximately 95 mils (2.4 mm)

in diameter, or the cross-section could be circumscribed by a circle 95 mils (2.4 mm) in diameter.

Example 1

A sample of round copolymer trimmer line labeled as having a 95 mil diameter was selected for testing. The diameter was measured and found to range from 94 to 96 mils. Ten pieces of line were cut to 6.5 inches and marked at 5 inches from a blunt cut end. A pair of lines was inserted into the Fury™ head such that 5 inches of line extended from each of the two opposing eyelets. The swath was 13 inches. The battery was inserted into the trimmer and it was allowed to operate until the lithium battery was depleted. The run time and the noise generated were recorded. This process was repeated until five pairs of lines were tested. The results were as follows:

| Sample # | Battery Run Time (minutes) | Noise (dB) |
|---|---|---|
| 1 | 53.8 | 84.0 |
| 2 | 54.5 | 83.5 |
| 3 | 56.5 | 83.3 |
| 4 | 56.0 | 83.8 |
| 5 | 55.7 | 84.0 |
| Avg. | 55.3 | 83.7 |
| Range | 2.7 | 0.7 |

Round line was tested because this is the most common shape of trimmer line.

Example 2

Figures 3A, 3B, 3C, 3D, 3E, 3F:
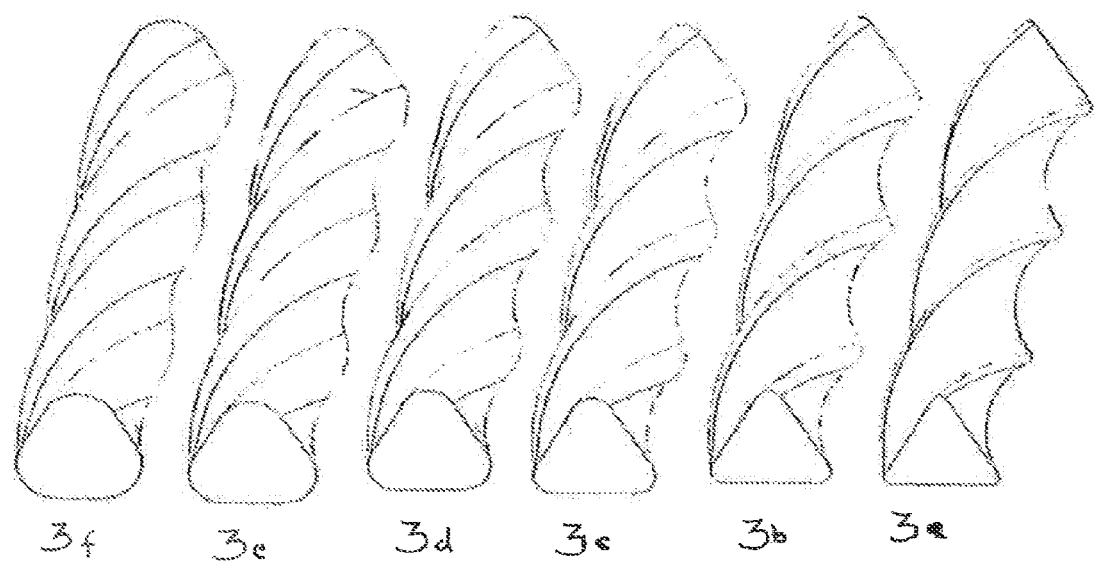
FIGS. 3a-f show a perspective view of six versions of a twist trimmer line of the present invention having a triangular-shaped cross-section.
Figures 4A, 4B, 4C, 4D, 4E, 4F:
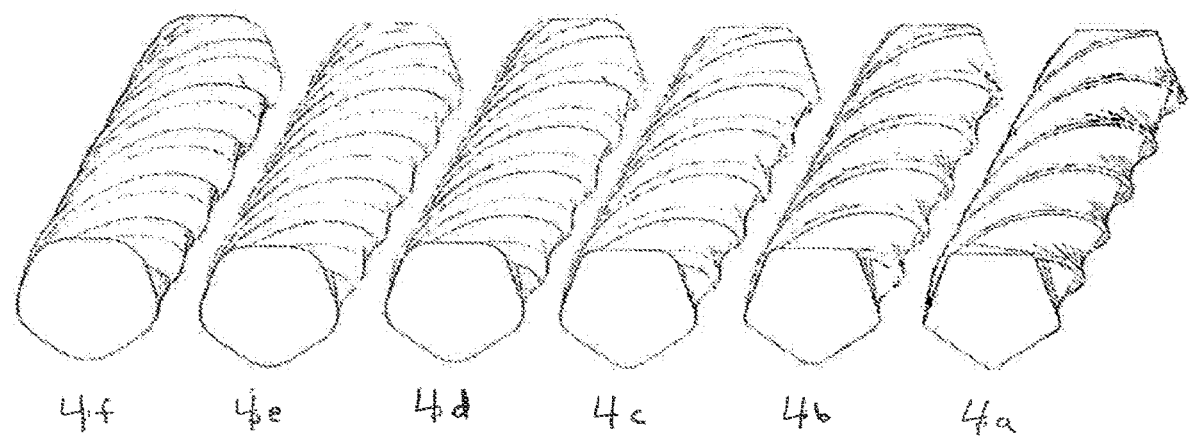
FIGS. 4a-f show a perspective view of six versions of a twist trimmer line of the present invention having a pentagonal-shaped cross-section.
Figures 5A, 5B, 5C, 5D, 5E, 5F:
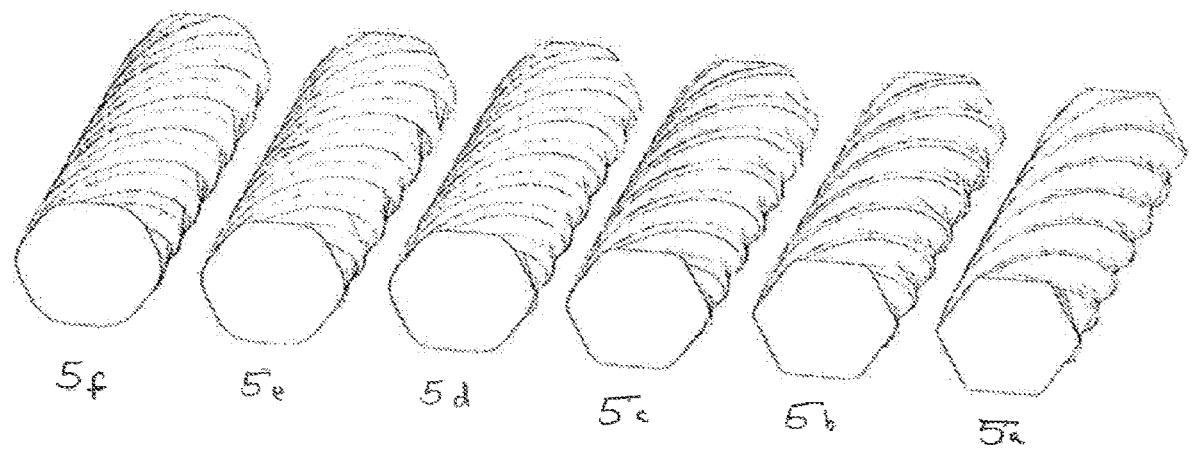
FIGS. 5a-f show a perspective view of six versions of a twist trimmer line of the present invention having a hexagonal-shaped cross-section.
Figures 6A, 6B, 6C, 6D, 6E, 6F:
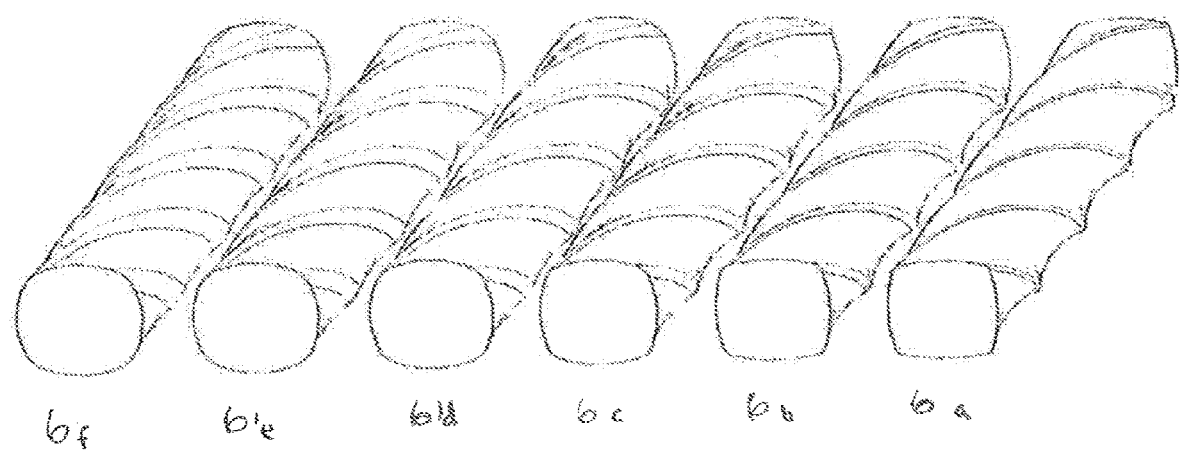
FIGS. 6a-f show an alternate embodiment of the twist trimmer line shown in FIGS. 2a-f.
Figures 7A, 7B, 7C, 7D, 7E, 7F:
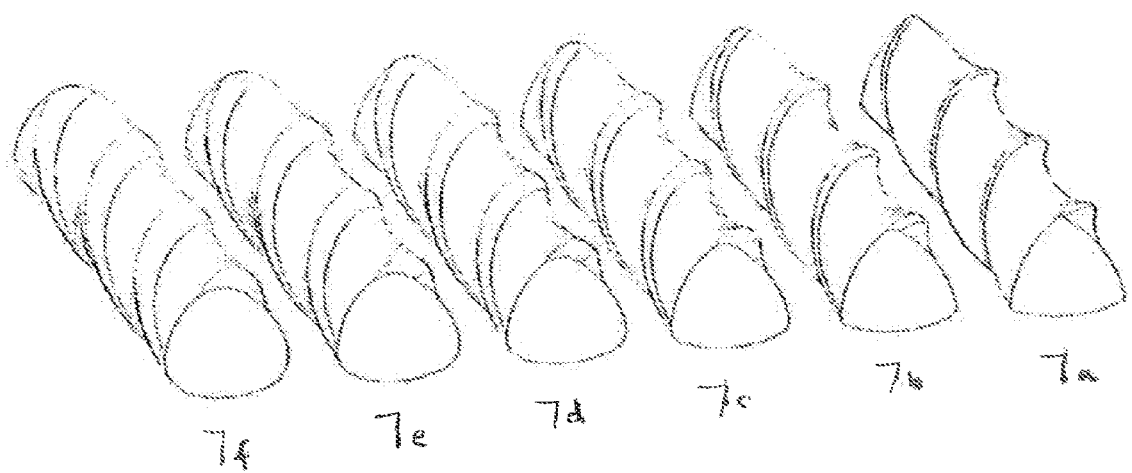
FIGS. 7a-f show an alternate embodiment of the twist trimmer line shown in FIGS. 3a-f.
Figures 8A, 8B, 8C, 8D, 8E, 8F:
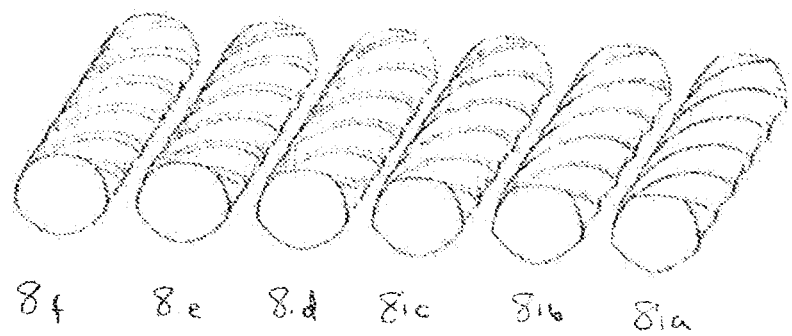
FIGS. 8a-f show an alternate embodiment of the twist trimmer line shown in FIGS. 4a-f.
Figures 9A, 9B, 9C, 9D, 9E, 9F:
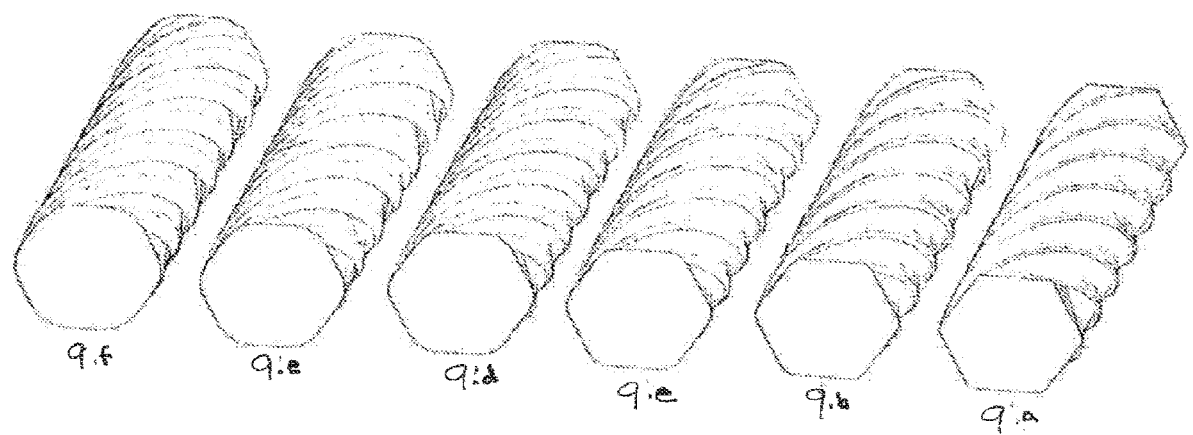
FIGS. 9a-f show an alternate embodiment of the twist trimmer line shown in FIGS. 5a-f.

A sample of trimmer line was made with the cross-section shown in FIG. 3d. The line was not twisted. Eight pieces of line were cut to 6.5 inches and marked at 5 inches from a blunt cut end. A pair of lines was inserted into the Fury™ head such that 5 inches of line extended from each of the two eyelets. The swath was 13 inches. The battery was inserted into the trimmer and it was allowed to operate until the lithium battery was depleted. The run time and the noise generated were recorded. This process was repeated until four pairs of lines were tested. The results were as follows:

| Sample # | Battery Run Time (minutes) | Noise (dB) |
|---|---|---|
| 1 | 48.9 | 88.0 |
| 2 | 63.9 | 76.5 |
| 3 | 55.9 | 83.8 |
| 4 | 56.5 | 83.8 |
| Avg. | 56.3 | 83.7 |
| Range | 15.0 | 8.5 |

The average battery run time and the average noise generated by this line was not statistically different from the round line. However, the range increased significantly. The increase in variation is thought to be attributable to the possible variations in orientation of the line's cross-sectional shape within the eyelet. Depending on the orientation of the line, the line's leading edge might be a flat shape, a circular arc, or somewhere between these two options.

Example 3

A sample of trimmer line was made with the cross-section shown in FIG. 3d. The trimmer line was manufactured to have one resolution of twist every 1.6 inch. Ten pieces of line were cut to 6.5 inches and marked at 5 inches from a blunt cut end. A pair of lines was inserted into the Fury™ head such that 5 inches of line extended from each of the two eyelets. The swath was 13 inches. The battery was inserted into the trimmer and it was allowed to operate until the lithium battery was depleted. The run time and the noise generated were recorded. This process was repeated until five pairs of lines were tested. The results were as follows:

| Sample # | Battery Run Time (minutes) | Noise (dB) |
|---|---|---|
| 1 | 61.2 | 70.0 |
| 2 | 59.9 | 72.3 |
| 3 | 62.1 | 72.5 |
| 4 | 61.8 | 72.0 |
| 5 | 59.0 | 72.5 |
| Avg. | 60.8 | 71.0 |
| Range | 3.1 | 2.5 |

In summary, the battery run time increased from 55.3 minutes for round line to 60.8 minutes for the twisted line made with the cross-sectional shape in FIG. 3d. This is an increase of 5.5 minutes, or 10%. The range for the battery run time for this example was minimal and comparable to the range for round line (Example 1). Additionally, the level of noise dropped from an average of 83.7 dB for round line down to 71.9 dB for the twisted shape. This drop of 11.8 dB is perceived by the human ear as more than a 50% reduction of the noise generated by the rotating line.

The rotating line was observed utilizing a strobe light. The rotating line was observed to be spinning in a single plane.

Example 4

Figure 1E:
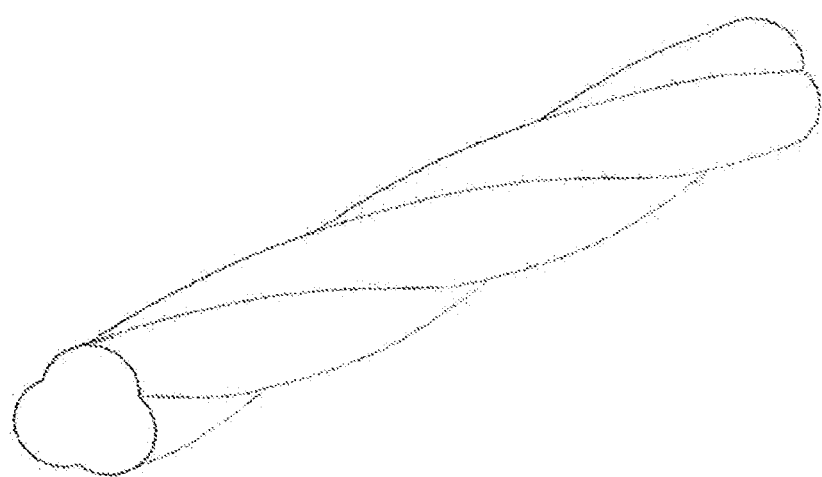
FIG. 1e shows a twist trimmer line from the prior art comprising a generally triangular shape with rounded corners and three longitudinal grooves.
Figures 2A, 2B, 2C, 2D, 2E, 2F:
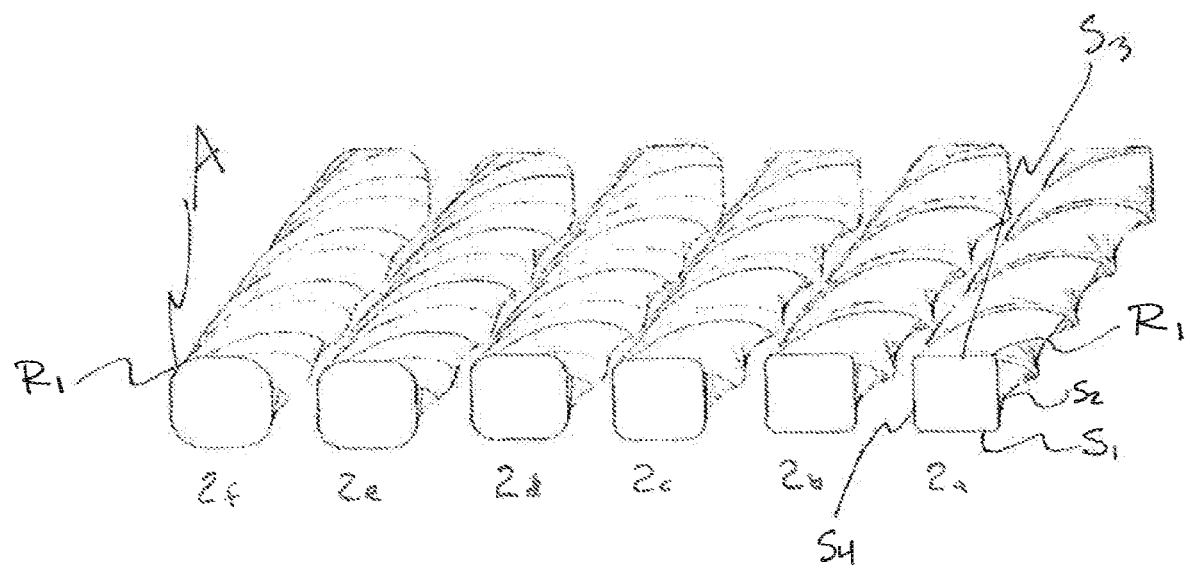
FIGS. 2a-f show a perspective view of six versions of a twist trimmer line of the present invention having a square-shaped cross-section.

An alternate sample of twist trimmer line was tested. The cross-section is depicted in FIG. 1e. It is similar to the cross-section shown in FIG. 3e, except that it also has three longitudinal concaved grooves. These grooves were located at the midpoint of each side. The line was twisted one revolution over 1.4 inches. Six pieces of line were cut to 6.5 inches and marked at 5 inches from a blunt cut end. A pair of lines was inserted into the Fury™ head such that 5 inches of line extended from each of the two eyelets. The swath was 13 inches. The battery was inserted into the trimmer and it was allowed to operate until the lithium battery was depleted. The run time and the noise generated were recorded. This process was repeated until three pairs of lines were tested. The results were as follows:

| Sample # | Battery Run Time (minutes) | Noise (dB) |
|---|---|---|
| 1 | 60.4 | 78 |
| 2 | 56.5 | 81 |
| 3 | 56.9 | 80 |
| Avg. | 57.9 | 79.7 |
| Range | 3.8 | 3 |

The average battery run time for this sample was approximately mid-way between the run time for round line (Example 1) and the sample in Example 3 above. The noise generated was above the mid-point for the lines in Examples 1 and 3 above; close to the noise generated for round line. Example 4 exhibits the negative impact of longitudinal grooves on both battery life and noise generation.

Example 5

A sample of non-twisted trimmer line was obtained with a cross-section per FIG. 1 of U.S. Pat. D358,535, which is a triangle with slightly concaved sides and truncated tips. The truncated tips result in six sharp longitudinal edges. Six pieces of line were cut to 6.5 inches and marked at 5 inches from a blunt cut end. A pair of lines was inserted into the Fury™ head such that 5 inches of line extended from each of the two eyelets. The swath was 13 inches. The battery was inserted into the trimmer and it was allowed to operate until the lithium battery was depleted. The run time and the noise generated were recorded. This process was repeated until three pairs of lines were tested. The results were as follows:

| Sample # | Battery Run Time (minutes) | Noise (dB) |
|---|---|---|
| 1 | 43.3 | 82 |
| 2 | 40.1 | 86 |
| 3 | 41.6 | 86 |
| Avg. | 41.7 | 84.7 |
| Range | 3.2 | 4.0 |

Unfortunately, this shape greatly reduced the average battery run time. The average battery run time was reduced by almost 25% compared to round line and was 31% less than Example 3. Additionally, the noise generated was slightly greater than the noise associated with round line.

The rotating line was observed with a strobe light. The line was observed fluttering between multiple planes of rotation.

Example 6

The same sample of trimmer line used in Example 5 was twisted to a level of one revolution every 0.75 inches. Two pieces of line were cut to 6.5 inches and marked at 5 inches from a blunt cut end. This pair of lines was inserted into the Fury™ head such that 5 inches of line extended from each of the two eyelets. The swath was 13 inches. The battery was inserted into the trimmer and it was allowed to operate until the lithium battery was depleted. The run time and the noise generated were recorded. The lines were then removed and reinserted and tested again. This process was repeated a third time. The results were as follows:

| Sample # | Battery Run Time (minutes) | Noise (dB) |
|---|---|---|
| 1 | 48.7 | 71 |
| 2 | 47.6 | 71 |
| 3 | 46.0 | 71 |
| Avg. | 47.4 | 71 |
| Range | 2.7 | 0 |

By twisting the shape in FIG. 1 of US D358,535, the battery run time was improved from 41.7 to 47.4 minutes relative to the same shaped line not twisted. Twisting this shape greatly attenuated the noise generated by the non-twisted shape (71 dB vs. 84.7 dB). However, the battery run time is still much less than 55.3 minutes of run time for round line. The best performing triangular shaped line of these examples is the twisted shape from Example 3—the battery run time was 60.8 minutes. The cross sectional shape in Example 3 had flat sides with no concaved grooves and generous circular arcs at the vertices.

The noise generated in Example 6 was at the lowest level of all the samples tested, but only slightly better than the line in Example 3. Example 3 and Example 6 are evidence that twisting a non-round cross-sectional shaped trimmer line to attenuate noise does not correlate to a similar reduction in drag. Example 6 attenuated the most noise, but consumed much more of the battery life compared to Example 3.

The average battery life and noise generated for all six of the above examples in summarized in TABLE 5 below:

TABLE 5

Data Summary for Examples 1-6

| Example | Avg. Battery Run Time (Min) | Avg. Sound Level (dB) |
|---|---|---|
| 1 | 55.3 | 83.7 |
| 2 | 56.3 | 83.8 |
| 3 | 60.8 | 71.9 |
| 4 | 57.9 | 79.7 |
| 5 | 41.7 | 84.7 |
| 6 | 47.4 | 71.0 |

Figure 16:
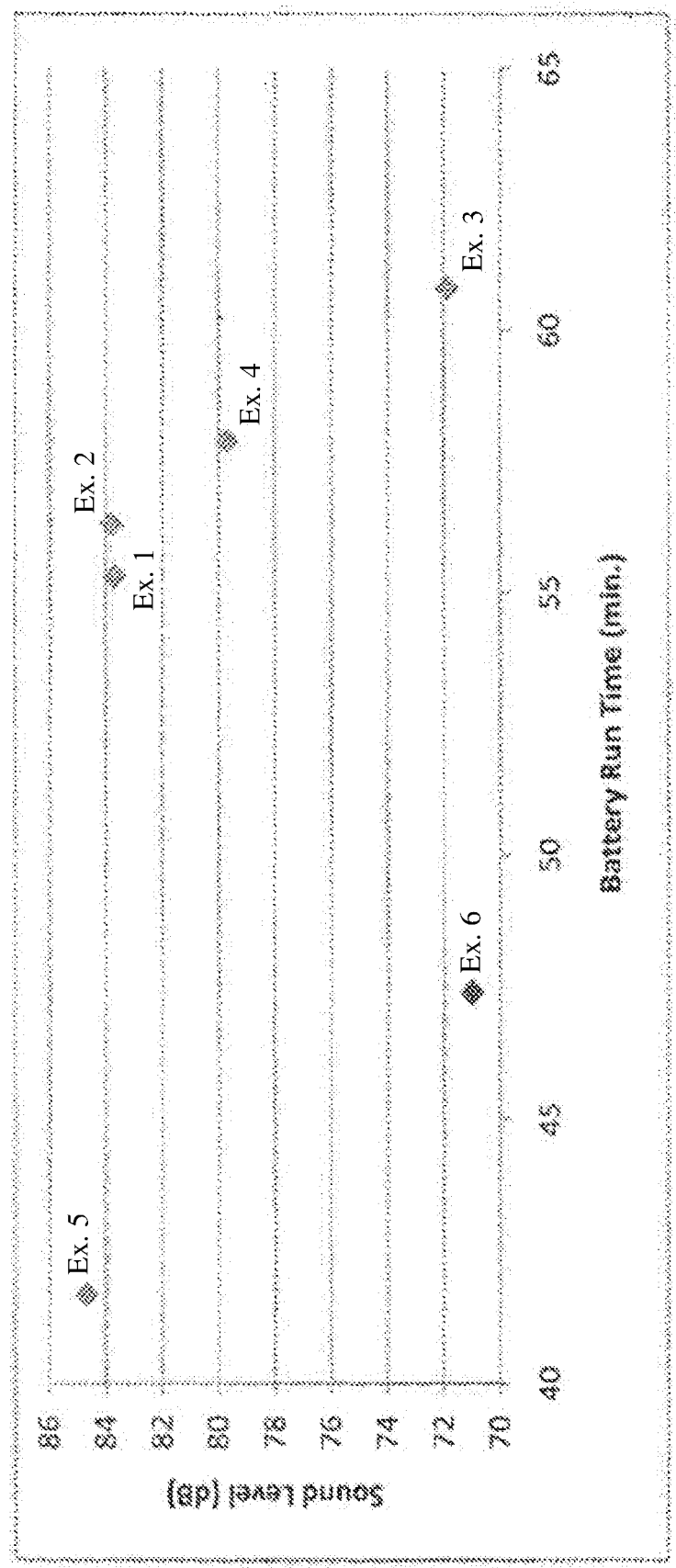
FIG. 16 is a graph of Battery Run Time versus Sound Level for six Example trimmer lines, the characteristics of which are shown in TABLE 5.

The data is also plotted in FIG. 16. The preferred trimmer line properties would be fibers with higher Battery Run Times and lower Sound Levels. For this data set, Example 3 has the best performance.

It is important to note that a 10 dB drop in sound levels is perceived by humans as a 50% drop in the level of noise generated. The drop from 79.7 dB for Example 4 to 71.9 dB for Example 3 is significant.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A trimmer line for use with a powered rotary trimmer device, comprising:
   a filament body having a longitudinal axis and a non-circular cross-sectional shape consisting essentially of at least three distinct sides and vertices present in an amount equal to the number of distinct sides, the vertices being located where adjacent ones of the at least three distinct sides converge,
   wherein each of the at least three distinct sides is straight,
   wherein each of the vertices consisting of a convex arc contour,
   wherein each of the convex arc contours has a radius R, and the ratio of the radius (R) to a diameter of a circle capable of circumscribing the cross-sectional shape of the filament body (D) is within the range of 0.05 to 0.30, and wherein the filament body is fixedly twisted about the longitudinal axis at a rate of between 0.75 inches to 3.0 inches of the filament body per full 360 degree revolution of the filament body,
   wherein each of the at least three distinct sides has no concaved longitudinal grooves.

2. The trimmer line of claim 1, wherein the filament body is fixedly twisted about the longitudinal axis at a rate of not more than one full 360 degree revolution of the filament body per 0.75 inches of the filament body.

3. The trimmer line of claim 1, wherein the filament body is fixedly twisted about the longitudinal axis at a rate of between about 1.6 to 1.7 inches of the filament body per full 360 degree revolution of the filament body.

4. The trimmer line of claim 1, wherein each of the at least three distinct sides of the cross-sectional shape are free of convex grooves.

5. A string trimmer line comprising:
   a monofilament body having a longitudinal axis and a non-circular cross-sectional shape comprising consisting essentially of three, four, five, or six distinct sides and vertices present in an amount equal to the number of distinct sides, the vertices being located where adjacent ones of the distinct sides converge,
   wherein each of the distinct sides is straight,
   wherein each of the vertices consist of a convex arc contour,
   wherein each of the convex arc contours has a radius R, and a ratio of the radius (R) to a diameter of a circle capable of circumscribing the cross-sectional shape of the filament body (D) is from 0.05 to 0.3;
   wherein each of the distinct sides has no concaved longitudinal grooves;
   wherein the filament body is fixedly twisted about the longitudinal axis at a rate of from 1.6 inches to 1.7 inches of the filament body per full 360 degree revolution of the filament body, and
   wherein the string trimmer line is configured for use with a powered rotary trimmer device for cutting grass, weeds, and vegetation.

6. The string trimmer line of claim 5, wherein the ratio of the radius (R) to the diameter of a circle capable of circumscribing the cross-sectional shape of the filament body (D) is 0.2.

* * * * *